Figure 1:
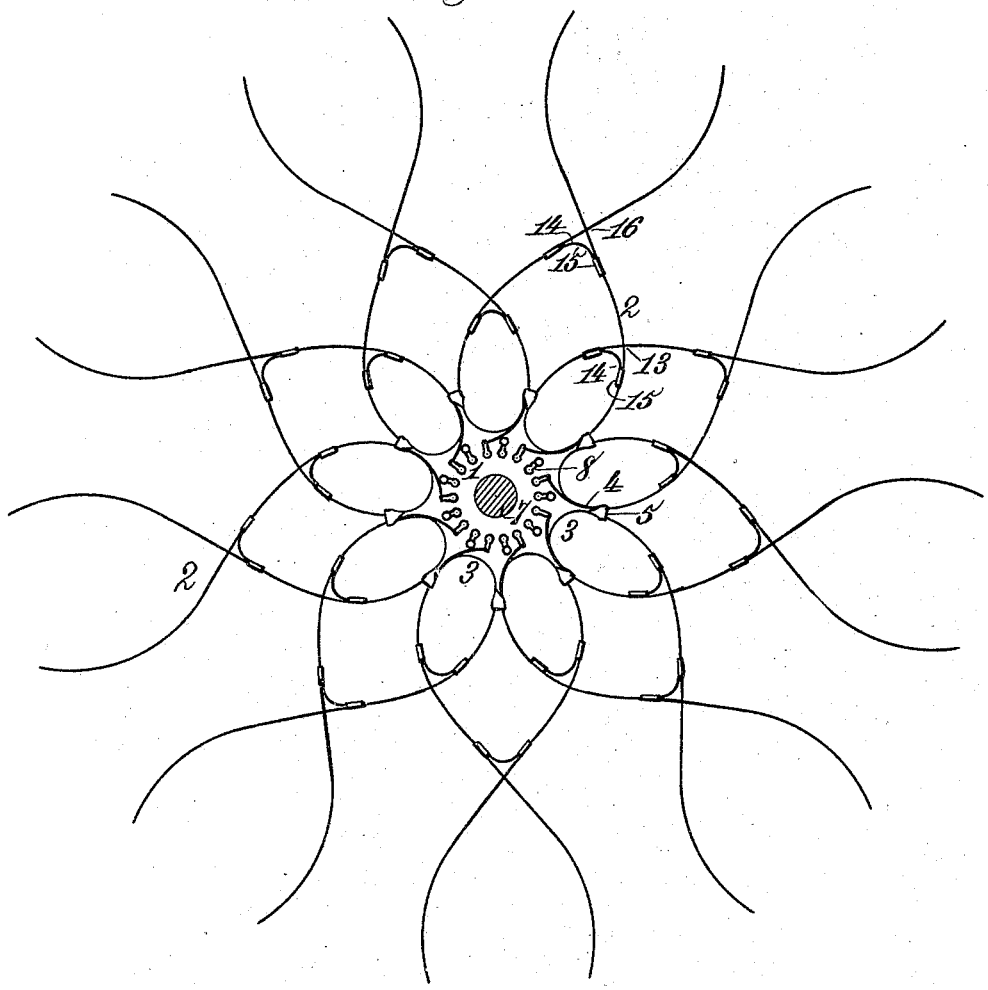

No. 641,085. Patented Jan. 9, 1900.
E. A. CROSSLEY.
WHEEL FOR BICYCLES OR OTHER VEHICLES.
(Application filed May 11, 1899.)

(No Model.) 2 Sheets—Sheet 1.

Witnesses.
Robert Everett.
W. B. Keefer.

Inventor.
Eliza A. Crossley,
By James L. Norris.
Att'y.

No. 641,085. Patented Jan. 9, 1900.
E. A. CROSSLEY.
WHEEL FOR BICYCLES OR OTHER VEHICLES.
(Application filed May 11, 1899.)
(No Model.) 2 Sheets—Sheet 2.
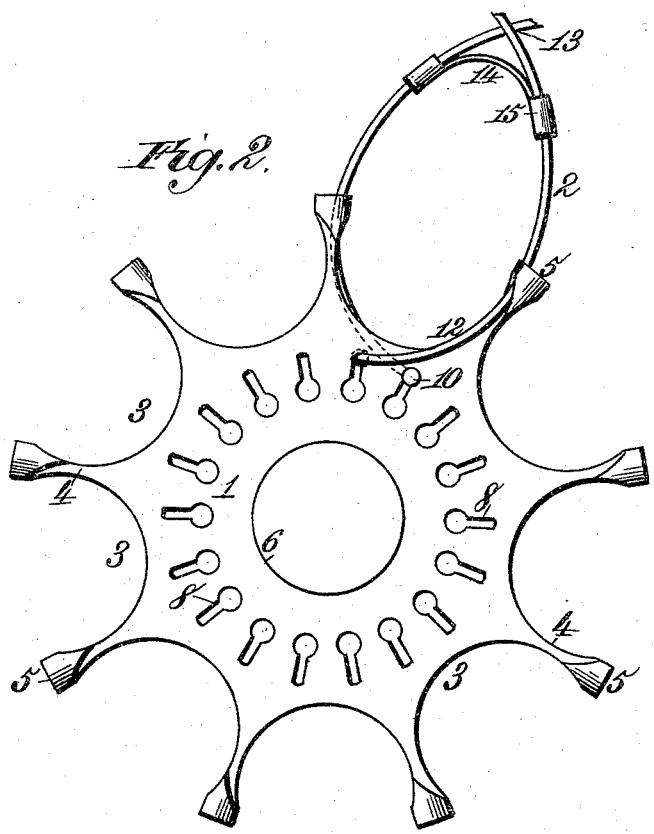
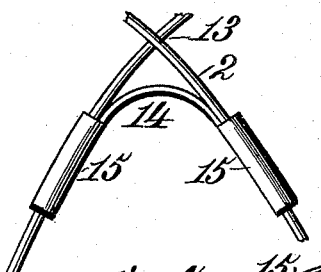
Witnesses. Inventor.
Eliza A. Crossley.
By James L. Norris.
Att'y.
THE NORRIS PETERS CO., PHOTO-LITHO., WASHINGTON, D. C.

UNITED STATES PATENT OFFICE.

ELIZA ANNE CROSSLEY, OF AUCKLAND, NEW ZEALAND.

WHEEL FOR BICYCLES OR OTHER VEHICLES.

SPECIFICATION forming part of Letters Patent No. 641,085, dated January 9, 1900.

Application filed May 11, 1899. Serial No. 716,426. (No model.)

*To all whom it may concern:*

Be it known that I, ELIZA ANNE CROSSLEY, a subject of the Queen of Great Britain, residing at Auckland, provincial district of Auckland, Colony of New Zealand, have invented certain new and useful Improvements in Wheels for Bicycles or other Vehicles, of which the following is a full, clear, and exact specification.

This invention relates to elastic wheels particularly designed for bicycles, but useful for tricycles and other vehicles.

The chief object of my invention is to provide a new and improved wheel of the character referred to which is strong, durable, elastic, and light in weight and wherein the spokes are so fastened, arranged, and applied to a flat or flattened hub-plate of characteristic construction that they can be individually removed if damaged and new spokes, one or more, very conveniently introduced, and each spoke, composed of wire or wire rod, is reversely curved and crosses two other similar spokes at different points from the axis of the hub-plate, the spokes being reinforced, strengthened, and held together in juxtaposition to all crossing-points through the medium of removable and replaceable arch-shaped spring bracing-clips bent into such shape that each comprises an arch-plate having clips at its ends adapted to embrace two different spokes.

The object of my invention is accomplished in the manner and by the means hereinafter described and claimed, reference being made to the accompanying drawings, in which—

Figure 1 is a front elevation showing the hub-plate, the wire or wire-rod spokes, and the bracing-clips, the wheel rim or tire being omitted. Fig. 2 is a front elevation, on a larger scale, showing the hub-plate and portions of some of the spokes applied thereto. Fig. 3 is a perspective view of a portion of the hub-plate, showing the construction of the duplex socket on each radial arm. Fig. 4 is a detail view showing the inner end portions of two spoke rods or wires and a bracing-clip applied thereto; and Fig. 5 is a detail perspective view of one of the steel-spring spoke-bracing clips prior to being bent into arch form for application to the spokes.

In order to enable those skilled in the art to make and use my invention, I will now describe the same in detail, referring to the drawings, wherein—

The numeral 1 indicates the wheel-hub, and 2 the elastic spokes. The wheel rim or tire is not shown, as it constitutes no part of my invention, and may be of any desired or known type and be connected to the outer ends of the spokes in any manner suitable for the purpose in hand.

The hub is composed of a flattened metal plate having its outer edge constructed with concavities or scallops 3 and formed integral with a plurality of radial arms 4, the outer extremity of each of which is reversely bent or twisted or otherwise fashioned to provide a double socket, or rather a pair of sockets 5 5, arranged side by side, as best seen in Fig. 3. The hub-plate 1 is formed with a central circular opening 6 to receive the axle 7, on which the wheel rotates, and around the axle-opening the plate is constructed with an annular row of spaced-apart keyhole-slots 8, corresponding in number to the number of wire or wire-rod elastic spokes 2, each pair of which passes through two of the spoke-sockets 5 on an arm 4 of the hub-plate. The inner ends of the spokes are provided with offsetting disk-shaped heads 10, which can pass through the larger ends of the key-slots 8 and then be engaged with the smaller or contracted parts of said slots by the inner ends of the spokes springing or moving outward, whereby the spokes are firmly and securely but detachably connected with the hub-plate. The spokes extend in curved paths, as at 12, from the keyhole-slots to and through the spoke-sockets 5 on the arms 4, and after passing through said sockets the spokes cross one another, as at 13, and form arches beneath which steel-spring bracing-clips 14 15 connect the crossing spokes together, and so reinforce, strengthen, and hold them tight. From the crossing-point 13 the spokes are reversely curved outward and again cross one another, as at 16, and form arches, which are similarly reinforced, strengthened, and held tight by steel-spring bracing-clips 14 15. These bracing-clips are each composed of a slender steel wire or rod 14, formed integral at each end, with split cylindrical clips 15, designed to embrace, surround, and hold the spokes, as will be clearly understood by reference to Fig. 4. The wire or rod 14 of each clip is bent or shaped into arched or curved form, as shown in Figs. 1, 2, and 4. In Fig. 5 the bracing-clip is represented in the form it bears prior to being arched or curved for application to the spokes.

It will be obvious that if any spoke breaks or is damaged it can be conveniently and quickly detached from the hub-plate and a new spoke introduced. The hub-plate and other parts may be made of any required size and of any metal suitable for the purpose. As many spokes can be used as may suit the wheel of which they form a part, and while there are as many keyhole-slots in the hub-plate as there are spokes employed there is but half the number of radial arms 4, since each arm is formed with a duplex socket, or rather two spoke-sockets 5. The bracing-clips are readily removable and replaceable, as the cylindrical clips 15 are split and can be easily folded around or unfolded from the spokes, as will be obvious.

Having thus described my invention, what I claim is—

1. A wheel-hub, consisting of a flattened hub-plate having a central axle-opening, radial arms each formed at its outer end portion with a duplex socket to receive two spokes, and an annular row of slots around said axle-opening for detachably engaging the inner ends of wheel-spokes, substantially as described.

2. A vehicle-wheel, consisting of a hub-plate having a central axle-opening, a plurality of radial arms, each formed at its outer end with a duplex socket to receive two spokes, and an annular row of slots between said axle-opening and said radial arms, a plurality of spoke rods or wires having heads at their inner ends detachably engaged, respectively, with said slots, two of the spoke rods or wires passing through the duplex socket of each radial arm and crossing one another at points beyond said duplex sockets to form arches, and bracing-clips detachably embracing the spoke rods or wires and reinforcing and holding said arches in proximity to the crossing-points of the spoke rods or wires, substantially as described.

3. A vehicle-wheel, consisting of a hub-plate formed with a central axle-opening, a plurality of radial arms each bent at its outer end to provide a duplex socket, and an annular row of keyhole-slots around the axle-opening, the crossing spoke rods or wires provided with heads at their inner ends detachably engaging the keyhole-slots, two of said spoke rods or wires passing through the duplex socket of each radial arm and curved from said socket to their heads, and spring bracing-clips composed of arched or curved rods formed with split clips at their ends which embrace the spoke rods or wires and firmly bind them together at their crossing-points, substantially as described.

4. A vehicle-wheel, consisting of a flat hub-plate having a central axle-opening, a plurality of radial arms each reversely bent at its outer end to provide a duplex socket, and an annular row of keyhole-slots around said axle-opening, a plurality of reversely-curved crossing and recrossing spoke rods or wires passing in pairs through the respective duplex sockets and formed with heads at their inner ends detachably engaged with the keyhole-slots, and inner and outer sets of bracing-clips detachably engaging the said spoke rods or wires in proximity to their said crossing and recrossing points, substantially as described.

ELIZA ANNE CROSSLEY.

Witnesses:
GEORGE WILLIAM BASLEY,
FRANCIS ERNEST BASLEY.